Patented July 8, 1947

2,423,761

UNITED STATES PATENT OFFICE 2,423,761

COATING COMPOSITION COMPRISING POLYBUTENE, AN ORGANIC SOLVENT AND AN AMINE ACETATE WETTING AGENT

Hector C. Evans, Cranford, and David W. Young, Roselle, N. J., assignors to Standard Oil Development Company, a corporation of Delaware No Drawing. Application July 9, 1943, Serial No. 494,012

3 Claims. (Cl. 260—32)

This invention relates to the preparation of improved coatings for solid materials and particularly for the preparation of improved coatings having high insulating powers and which coatings are at the same time tough, pliable and elastic under extreme conditions of temperature and weather, entirely impermeable to water, gases and moisture and not affected by atmospheric influences.

Linear hydrocarbon polymers of about 4000 to 500,000 molecular weight (as determined by the Staudinger method, see J. Ann., 541 (2), 151–195 (1939), and Industrial and Engineering Chemistry, vol. 34, page 461, April 1942), are used in coating compositions. The linear hydrocarbon polymers are obtained by polymerizing unsaturated hydrocarbons such as isobutylene and and the like. The polymerization of isobutylene is generally carried out below —10° F. with a halide catalyst such as boron fluoride, and in some cases aluminum chloride in methyl chloride, aluminum bromide, titanium tetrachloride, titanium tetrafluoride, etc., the molecular weight generally being controlled by the purity of the olefin, the type of catalyst, the concentration of the catalyst, the reaction time and the temperature of the polymerization. The higher polymers are obtained at very low temperatures with the aid of the more active type catalyst and with very pure olefins. These polymers may, in many respects as to nature, form, etc., be considered intermediates between a fluid mineral oil and natural rubber. However, they possess superior properties in many ways over both these materials, i. e., the polymers possess high viscosities and are soluble in mineral oils and do not become brittle on cooling to low temperatures such as —20° to —40° F. The polymers of about 100,000 M. W. have a Mooney viscosity of 60 to 85 at 100° C.

Ignition cables used on aircraft engines are subjected to very abrupt changes in temperature and in humidity with the result that where olefin polymers are used the coating has at times allowed an absorption of moisture with consequent deterioration of insulating qualities of the coating as well as injury to the wire itself.

The high molecular weight linear olefin type polymers possess poor adhesion to a number of solid materials, such as concrete (wet and dry), trap rock (wet and dry), leather, glass, wood, stone, metal (wet and dry), paper, resins, cloth, etc.

An object of this invention is to prepare an insulating coating that possesses high dielectric strength and consequently affords a high degree of insulation to the wire coated with it.

Another object of this invention is to prepare an insulating coating that is non-hydroscopic thereby preventing the absorption of moisture.

A still further object of this invention is to prepare an insulating coating which is both flexible and elastic to a marked degree and may be bent at various angles without a rupture of the coating.

A still further object of this invention is to prepare an insulating coating that possesses a high resistance to heat that is, that it may be subjected to the higher temperatures without charring and a loss of strength and insulating qualities of the coating.

A still further object of this invention is to prepare a low cost polymer-resin type of coating that possesses the good property of adhesion.

These and other objects of the invention will be understood on reading the following description.

According to this invention a solution of the polymer is prepared by dissolving 100,000 M. W. polybutene polymer in a solvent, for example benzene. The proportions used are from 1 to 5 parts of polymer to 10 to 20 parts of solvent, 1 to 10 parts being preferred. Other solvents may be used such as heptane, cyclohexane, carbon tetrachloride, amyl ether, carbon disulfide, etc. Into the solvent is then introduced a wetting agent such as an amine salt or amine. The type of amines to be used are as follows:

Di-N-octadecyl amine
Di-N-octyl amine
Mono-N-decyl amine
Mono-N-dodecyl amine
Mono-N-hexadecyl amine
Mono-N-octadecenyl amine
Mono-N-tetradecyl amine
N-2-hydroxyethyldodecyl amine Most basic salts of the above amines or alkyl amines may likewise be used such as the formates, acetates, hydrochlorides, etc. The higher molecular weight members of the acetate salt series are preferred as they are more soluble in the polymer and less soluble in water. Nitriles such as N-octane nitrile, N-decane nitrile, N-dodecane nitrile, N-hexadecane nitrile, and other nitriles having at least 4 carbon atoms to the molecule may be used. Mixtures of these wetting agents are also suitable. An ignition cable consisting of copper wire is first coated with a rubber insulated material with a surface coating of fibre glass braid. This fibre glass is then impregnated with the above polymer solution by immersing the fibre glass braided ignition cable in this solution and maintaining a vacuum of 14 to 24 inches at a temperature ranging from 16° C. to about 27° C. for a time period ranging from 5 to 30 minutes. After the wire is impregnated it is removed and dried to evaporate the solvent. The impregnated fibre glass braided ignition wire is then tested to determine its insulating properties. This test is carried out by stripping 3 inches of each end of an 18 inch covered wire sample and immersing in distilled water for a period of about one-half hour, removing and immersing all but ¾ to 1 inch of each end of the insulated cable in salt water, holding the leads one inch apart and applying a voltage across the leads. The cable must pass 20 kw.

*Example 1*

A 12.6% polybutene clear solution was formulated in a glass flask by adding 104,000 molecular weight polymer to benzene at room temperatures. To formulate solution, the polymer, solvent mixture was agitated by a power motor and a metal stirrer for about 8 hours. When the solution was clear, 2.0% by weight of dodecyl amine acetate was added to the benzene polymer solution.

The final polymer solution was then placed in a glass flask with about 38 inches of ⅝ inch diameter glass covered ignition cable. The flask, with polymer solution and cable, was then placed under 24 inches of vacuum at about 16° C. for 5 minutes. The vacuum was then removed and the glass covered ignition cable removed from the excess polymer benzene solution. After about 2 hours the polymer coating was dry and the cable was given the voltage test as shown above.

It was found that when the R-amine acetate, R-amine chloride, R-amine or RCN was used the polybutene treated ignition cables passed the ignition test.

Polybutene solutions, polybutene resin solutions, polybutene resin solutions with a filler, may be used as coating materials for paper, leather, glass, metal, rock, concrete, etc.

Tests have shown that the adhesion of the linear type high molecular weight polymer is greatly improved when the wetting agent is used in amounts of about 0.2 to 5.0%.

When the lower molecular weight polymers of polybutene are used (below about 60,000) it is very desirable to add an inert filler to reduce surface tack. For example:

*Solution A*

| | Per cent |
|---|---|
| 54,000 molecular weight polybutene | 12.5 |
| Clay | 6.0 |
| Mono-N-decyl amine | 0.5 |
| Heptane | 81.0 |

*Solution B*

| | |
|---|---|
| 50,000 M. W. polybutene | 15.0 |
| Copolymer of styrene with ethyl fumarate* | 10.0 |
| Mono-N-decyl amine-formate | 0.5 |
| V. M. and P. naphtha | 74.5 |

*Solution C*

| | |
|---|---|
| 30,000 M. W. polybutene | 15.0 |
| Copolymer styrene with isobutylene | 10.0 |
| N-decane nitrile | 0.5 |
| Carbon tetrachloride | 81.0 |

*Chemical reaction to formulate resin is as follows:

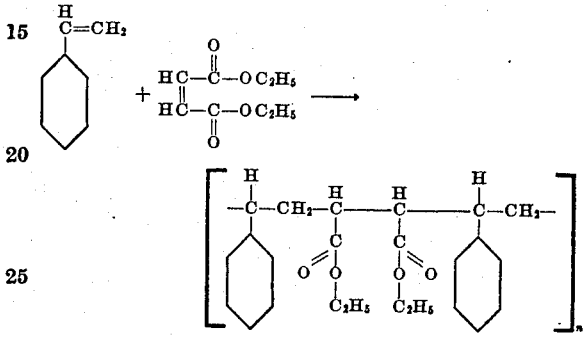

Resins are formulated from styrene and ethyl fumarate made by heating a benzol solution of the monomers under reflux with 0.5% benzoyl peroxide for about 18 hours at 50° to 80° C.

We claim:

1. A coating composition adapted for providing an insulating coating of high dielectric strength, comprising a solution of 1 to 5 parts by weight of a 30,000 to 104,000 molecular weight polybutene as determined by the Staudinger method, in 10 to 20 parts by weight of a volatile organic solvent, and 0.2 to 5%, based on the weight of said solution, of a wetting agent having from 12 to 20 carbon atoms to the molecule and selected from the class of amine acetate salts soluble in the polybutene.

2. A coating composition comprising an organic solution of 1 to 5 parts by weight of a 30,000 to 104,000 molecular weight polybutene as determined by the Staudinger method, in 10 to 20 parts by weight of an organic solvent, and 0.2 to 5%, based on the weight of said solution, of dodecyl amine acetate.

3. A coating composition comprising a benzene solution of 1 to 5 parts by weight of a 30,000 to 104,000 molecular weight polybutene as determined by the Staudinger method, 10 to 20 parts benzene, and 0.2 to 5%, based on the weight of said solution, of dodecyl amine acetate.

HECTOR C. EVANS.
DAVID W. YOUNG.

REFERENCES CITED

The following references are of record in the file of this patent:

UNITED STATES PATENTS

| Number | Name | Date |
|---|---|---|
| 2,176,903 | Izard | Oct. 24, 1939 |

OTHER REFERENCES

Pages 461 to 466, Industrial and Engineering Chemistry, vol. 34, No. 4, April 1942.